(12) United States Patent
Peeler

(10) Patent No.: US 10,293,277 B2
(45) Date of Patent: May 21, 2019

(54) DEVICE AND METHOD FOR GLEANING FAT RESIDUE FROM THE LIQUID CONTENTS OF A COOKING VESSEL

(71) Applicant: Dustin Peeler, Scottdale, GA (US)

(72) Inventor: Dustin Peeler, Scottdale, GA (US)

( * ) Notice: Subject to any disclaimer, the term of this patent is extended or adjusted under 35 U.S.C. 154(b) by 49 days.

(21) Appl. No.: 15/399,886

(22) Filed: Jan. 6, 2017

(65) Prior Publication Data

US 2018/0193768 A1  Jul. 12, 2018

(51) Int. Cl.

| | |
|---|---|
| *C02F 1/68* | (2006.01) |
| *B01D 17/02* | (2006.01) |
| *C02F 1/40* | (2006.01) |
| *C02F 1/28* | (2006.01) |
| *A47J 43/28* | (2006.01) |
| *B01J 49/00* | (2017.01) |
| *C02F 101/32* | (2006.01) |
| *C02F 103/32* | (2006.01) |

(52) U.S. Cl.
CPC ........ *B01D 17/0202* (2013.01); *A47J 43/284* (2013.01); *C02F 1/281* (2013.01); *C02F 1/40* (2013.01); *C02F 2101/32* (2013.01); *C02F 2103/32* (2013.01); *C02F 2303/16* (2013.01)

(58) Field of Classification Search
None
See application file for complete search history.

(56) References Cited

U.S. PATENT DOCUMENTS

| | | |
|---|---|---|
| 1,601,349 A | 9/1926 | Cortes |
| 1,703,963 A | 3/1929 | Scruby |
| 5,223,128 A | 6/1993 | Combrowski |
| 5,643,459 A | 7/1997 | Hubred et al. |
| 7,504,058 B1 | 3/2009 | Batten et al. |

*Primary Examiner* — Hayden Brewster
(74) *Attorney, Agent, or Firm* — J.T. Hollin Attorney at Law, P.C.

(57) ABSTRACT

Disclosed is an apparatus and method for the immediate manual removal of fat and/or grease from a liquid broth in a cooking vessel after or during the preparation of certain items of food. The method is readily accomplished by the utilization of two co-planar, shaft-mounted pulleys moving an elastomeric, flat belt through the liquid in the cooking vessel. Fat molecules will tend to adhere to the belt, while water molecules in the liquid broth will cling to each other more readily than to the belt. Thus the water droplets, by the force of gravity, are separated from fat droplets that adhering to the moving belt. Dual, advantageously-placed wipers, pressed against the outer and inner surfaces of the moving belt, scrape the clinging fat particles onto a downward sloping spout, thus routing the fat into a storage container.

10 Claims, 5 Drawing Sheets

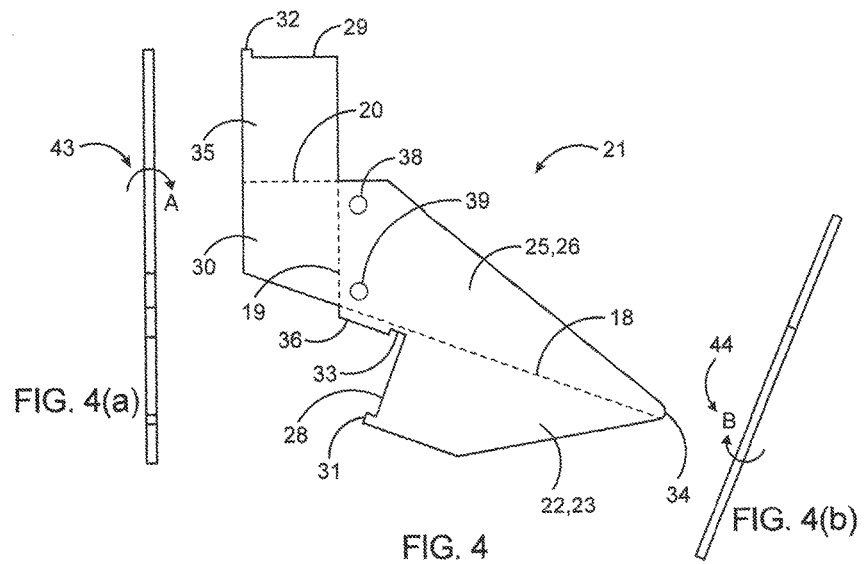
FIG. 4(a)
FIG. 4
FIG. 4(b)
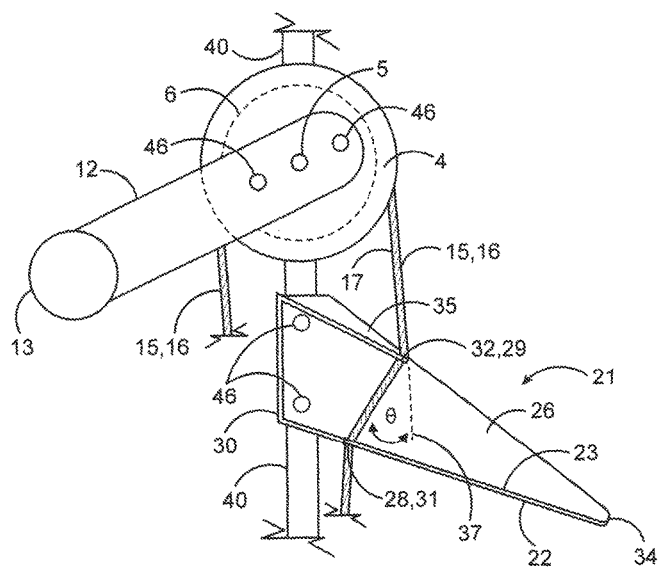
FIG. 5

DEVICE AND METHOD FOR GLEANING FAT RESIDUE FROM THE LIQUID CONTENTS OF A COOKING VESSEL

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

(1) Field of the Invention

This inventive concept relates to devices and methods for the removal and recovery of oil and grease resulting from preparing of certain foods in a cooking vessel used in a homemaker's kitchen or that of a restaurant.

Oil, grease and solid waste contaminant removal or recovery systems are well known in the prior art. Over the last several years there has been a trend towards requiring food handling facilities to have systems for servicing kitchen grease and solid waste bearing water flows. Sewer system lines can become clogged from the oil and grease waste materials put into those systems from food handling facilities and from hundreds of homemaker's kitchens connected to the same sewer line.

This has led more and more municipal authorities to implement fats, oils and grease (FOG) control programs. These programs regulate food handling facilities and the manner in which they process oil, grease and solid waste material.

The object of many of these programs is to ensure that food handling facilities remove as much of the oil and grease as possible from the effluent flow, thereby releasing only grey water to the sewer system.

A primary objective of the present inventive concept is to eliminate the waiting time for oil or fat to solidify atop the cooking liquid before the oil and/or grease is removed for disposal or storage.

(2) Description of the Related Art, Including Information Disclosed Under 37 CFR 1.97 and 1.98

U.S. Pat. No. 7,504,058; A low cost oil, grease removal assembly includes a rotomolded plastic container having an inlet and an outlet; a rotomolded plastic basket support located at the inlet inside the container, a rotomolded plastic outlet baffle located in the container at the outlet; a plurality of container cover sections including a first section to cover the basket support, a second container cover section having an oil, grease removal mechanism downstream of the basket support and upstream of the outlet baffle, and a third container cover section to cover the outlet baffle.

U.S. Pat. No. 5,643,459; Jul. 1, 1997 Flotation apparatus (10) for removing finely divided bodies of an insoluble substance dispersed in an aqueous medium, such as oil and solids dispersed in water, comprises a vertical flotation column (12) having a feed inlet (14) and an outlet (22) for the aqueous medium, a sparging system (16) for generating gas bubbles rising upwardly in the aqueous medium to capture and raise the finely divided bodies of the insoluble substance to the surface of the aqueous medium in the column to form a layer (31) of the insoluble substance on the surface of the aqueous medium, a launder (18) for receiving an overflow of the insoluble substance and an outlet (20) for the insoluble substance in the launder.

U.S. Pat. No. 5,223,128; Jun. 29, 1993 Apparatus for cleaning a bath of liquid, in particular a metal-working machine lubricant and/or coolant, by means of a conveyor belt which is fed around a drive roller, driven by a motor, in a chamber of a housing and dips into the bath of liquid, characterized in that the conveyor belt is provided with a stripper having a stripping edge directed oppositely to the direction of rotation of the conveyor belt.

U.S. Pat. No. 4,876,011 Oct. 24, 1989 An apparatus for skimming oil from the surface of a liquid is disclosed. The apparatus includes an endless belt which is formed from the loop portion of a loop and hook type fastener. The belt is supported to move in a path of travel with a portion of the belt disposed within the liquid. As the belt travels, oil is captured within the material of the belt. A scraping mechanism is provided for scraping an initial amount of oil off of the belt. Rollers are provided for squeezing out the remaining oil on the belt. Oil which is removed by the scrapers and the rollers is captured in a pan and collected.

U.S. Pat. No. 1,703,963; Mar. 5, 1929. In an apparatus of the class described, a pair of spaced pulleys, a belt running closely between said pulleys, a pair of upper troughs below said pulleys; one trough to either side of the belt and each having an edge closely disposed to said belt; said upper troughs having under surfaces sloping away from said belt at an acute angle, and other troughs below said upper troughs; said other troughs spaced away from said belt a greater distance.

U.S. Pat. No. 1,601,3491; Sep. 28, 1926 This invention relates to an elevator for raising all kinds of thick liquids; like crude oil, molasses, mineral slimes, etc., some of which are difficult to pump through pipe lines under atmospheric temperature. The adhesiveness of such thick liquids is taken advantage of for raising them, to higher levels, by conducting an endless belt of the elevator through the liquid contained in some form of a receptacle like tanks, dams, etc. and another endless belt inside the submerged belt so as to receive whatever liquid which may drop from the endless belt having contact with the liquid in the tank; both endless belts are moved vertically against scrapers, one of which extends into a gutter, for collecting the liquid when it has been raised to a higher level by adhering to the belts.

BRIEF SUMMARY OF THE INVENTION

The general object of the present inventive concept is to provide a device and method for the immediate removal of oil and/or fat from the liquid (primarily water in the form of a broth) contents of a kitchen cooking vessel. This objective is readily accomplished by the utilization of a manual, vertically-oriented crank, comprising an upper pulley 4 and a lower pulley 7 moving a flat elastomeric belt 15 downward into and immediately continuing upward through the broth. The device embodying this inventive concept is entitled a "fat separator 1." Experience has shown that a belt constructed from silicone is the most effective material to accomplish the object of the method disclosed. Water has both cohesive and adhesive properties. When separated, water molecules tend to stick to each other to form a sphere, which exhibits the cohesive characteristics of water. On the other hand, oil and fat have stronger adhesive forces rather than cohesive properties. Thus a belt of silicone, when pulled upward through a cooking mixture or broth, containing both fat and water, the fat molecules will tend to cling to the belt, while the water molecules will cling to each other as droplets and fall off the belt.

In a different embodiment of the inventive device, the crank, or fat separator 1, may be electrically powered. The silicone belt is pulled slowly upward through a broth which contains a mixture of water and the remnants of cooking fat or grease resulting from the preparation of an item of food.

BRIEF DESCRIPTION OF THE VIEWS OF THE DRAWINGS

FIG. 4 is a plan view of a machinist's layout of a metallic (or plastic) spout 21 prior to completing the forming of the final shape of the spout 21

FIG. 4(a) shows the left profile view of the layout of the spout 21 shown in FIG. 4.

FIG. 4(b) presents a right profile view of the layout of the spout 21 shown in FIG. 4.

FIG. 5 is a view of the upper pulley 4 and the inner wall 26 of the spout 21 as they are attached to the shaft 40 of the fat separator 1.

Figure 1:
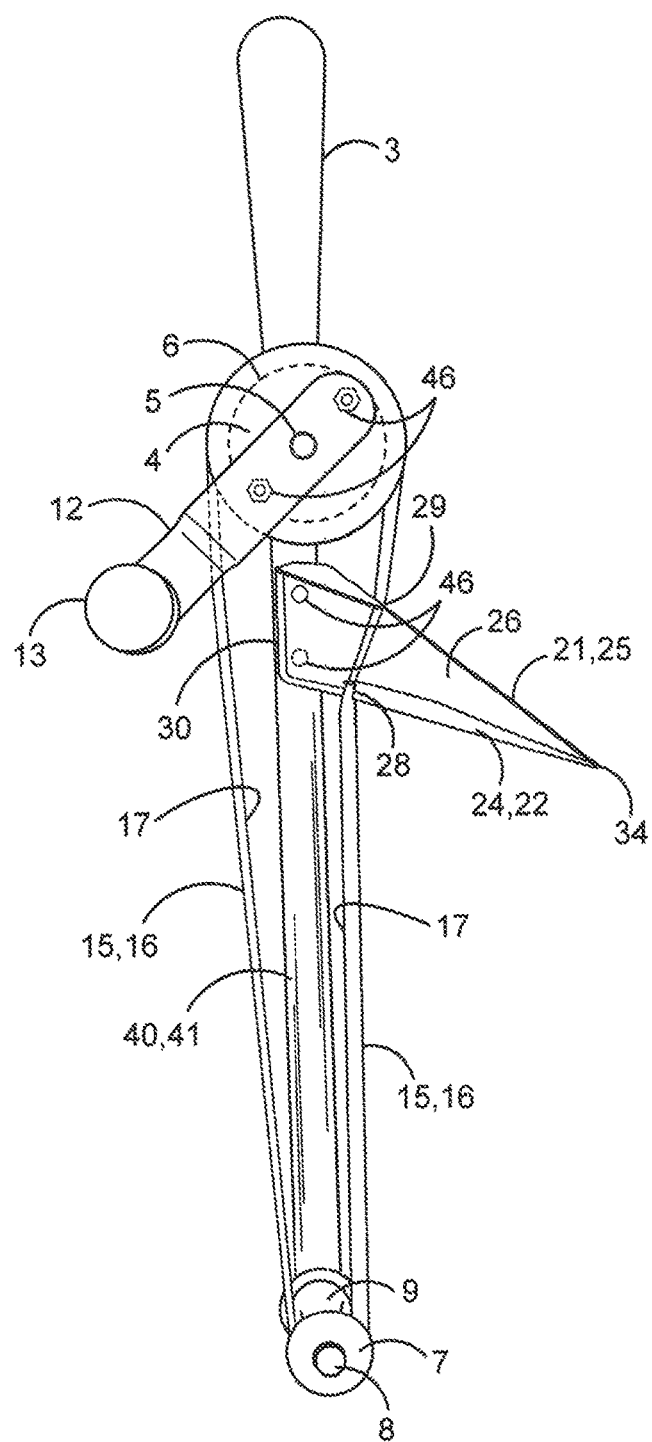
FIG. 1 is a view of the right side of a fat separator 1 device wherein the inner face 41 of the shaft 40 shown.

Table of Nomenclature & Part Numbers of Fat Separator

1. Fat separator
2. N/A
3. Handhold
4. Upper pulley
5. Upper axle
6. Upper core
7. Lower pulley
8. Lower axle
9. Lower core
10. N/A
11. N/A
12. Arm
13. Knob
14. Machine screw
15. Belt
16. Belt outer surface
17. Belt inner surface
18. First bend line
19. Second bend line
20. Third bend line
21. Spout
22. Spout bed
23. Bed upper surface
24. Bed lower surface
25. Spout wall
26. Inner wall
27. Outer wall
28. Lower wiper
29. Upper wiper
30. Spout backing
31. Lower tab
32. Upper tab
33. Recess
34. Tip
35. Angler
36. Guide tab -continued Table of Nomenclature & Part Numbers of Fat Separator 37. Angle 0
38. Upper hole
39. Lower hole
40. Shaft
41. Shaft inner face
42. Shaft outer face
43. Rotation A
44. Rotation B
46. Machine screw
50. Cooking vessel
51. Liquid/broth
52. Container
53. Fat Droplet

DETAILED DESCRIPTION OF THE INVENTION

The objects, features, and advantages of the inventive concept presented in this application are more readily understood when referring to the accompanying drawings. The drawings, totaling eight figures, show the basic components and functions of embodiments and/or methods of use. In the several figures, like reference numbers are used in each figure to correspond to the same component as may be depicted in other figures.

The discussion of the present inventive concept will be initiated with FIG. 1. In FIG. 1 there is illustrated a right-side view of the fat separator 1, which is the general name of the present device. Essentially, the fat separator 1 is for the purpose of expediting the separation of resulting fat/grease 53 from a broth or liquid 51, said fat/grease 53 generated during, or after a cooking process has been completed. A user of the fat separator 1, operating it most effectively, would be oriented to the left side of the fat separator 1 shown in FIG. 1. In this manner, the shaft 40 inner face 41 is oriented proximate the upper pulley 4. As is noted in FIG. 1, the lower pulley 7 is of considerably smaller diameter than the upper pulley 4.

FIG. 1 shows the principal components of the fat separator 1, being a vertically-oriented, linear shaft 40, a handhold 3, an upper pulley 4 having a core 6 (hidden from view) integral to a large inner flange 10 and a parallel large outer flange 10. The large outer flange 11 of the upper pulley 4 is shown connected to an arm 12, to which in turn, a knob 13 is connected. Also shown in FIG. 1 is a lower pulley 7 having a core 9 orthogonal to an outer flange and an inner flange 7(a), 7(b), a continuously looped, flat feeder belt 15, and a spout 21. The lower pulley 7 is shown to be attached to the inner face 41 of the shaft 40 by a lower axle 8. The inner surface 17 of the belt 15 engages the core 9 of the lower pulley 7 in a taut manner. Similarly, as is more clearly shown in FIG. 5, the inner surface 17 of the belt 15 engages the core 6 of the upper pulley 4.

In FIG. 1, the upper pulley 4 as shown, is rotatingly connected to the inner face 41 of the shaft 40 by means of an upper axle 5 which is affixed to the inner face 41 of the shaft 40. The inner face 41 of the shaft 40 is shown to be oriented so as to function in close proximity to the large inner flange 10 of the upper pulley 4. An extended arm 12 is fastened to the outer flange 11 of the upper pulley 4 by means of two machine screws 46. A knob 13 is attached to the arm 12 so as to provide leverage for a user to turn the upper pulley 4. FIG. 1 also presents a view of the inner wall 26 of the spout 21 and the lower surface 24 of the spout bed 22. The spout 21 is attached to the inner face 41 of the shaft 40 by means of two machine screws 46.

Figure 6:
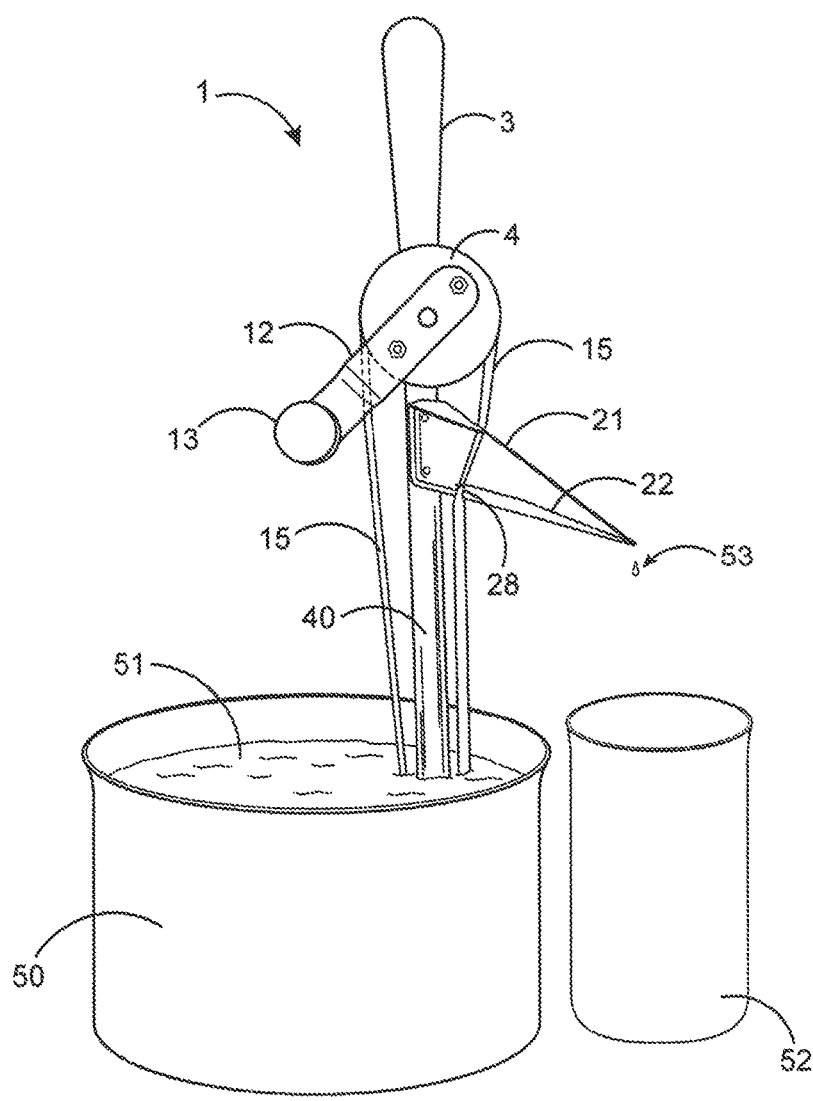
FIG. 6 shows the fat separator 1 functioning while immersed in the liquid/broth 51 of a cooking vessel 50 and depositing fat droplets 53 into a receiving container 52.

For the fat separator 1 to function as intended, a user must immerse the lower pulley 7 into a liquid/broth 51 and turn the arm 12 in a clockwise direction, thereby placing the belt 15 in motion. In viewing FIG. 5, it is more clearly shown that the outer surface 16 of the belt 15, when placed in motion, will scrape against an upper wiper 29, while simultaneously, the outer surface 17 of the belt 15 scrapes against a lower wiper 28. Fat particles 53 (shown in FIG. 6) cling to the belt 15 during its looping travel profile, and the fat particles 53 are continuously scraped off the belt 15 by the upper and lower wipers 29, 28. The fat particles 53 are forced to fall onto the inner surface 23 of the spout bed 22, flow downward to the tip 34 of the spout 21, and into a collecting container 52. FIG. 6 displays the fat separator 1 in actual use, while immersed in a cooking vessel 50.

Figure 2:
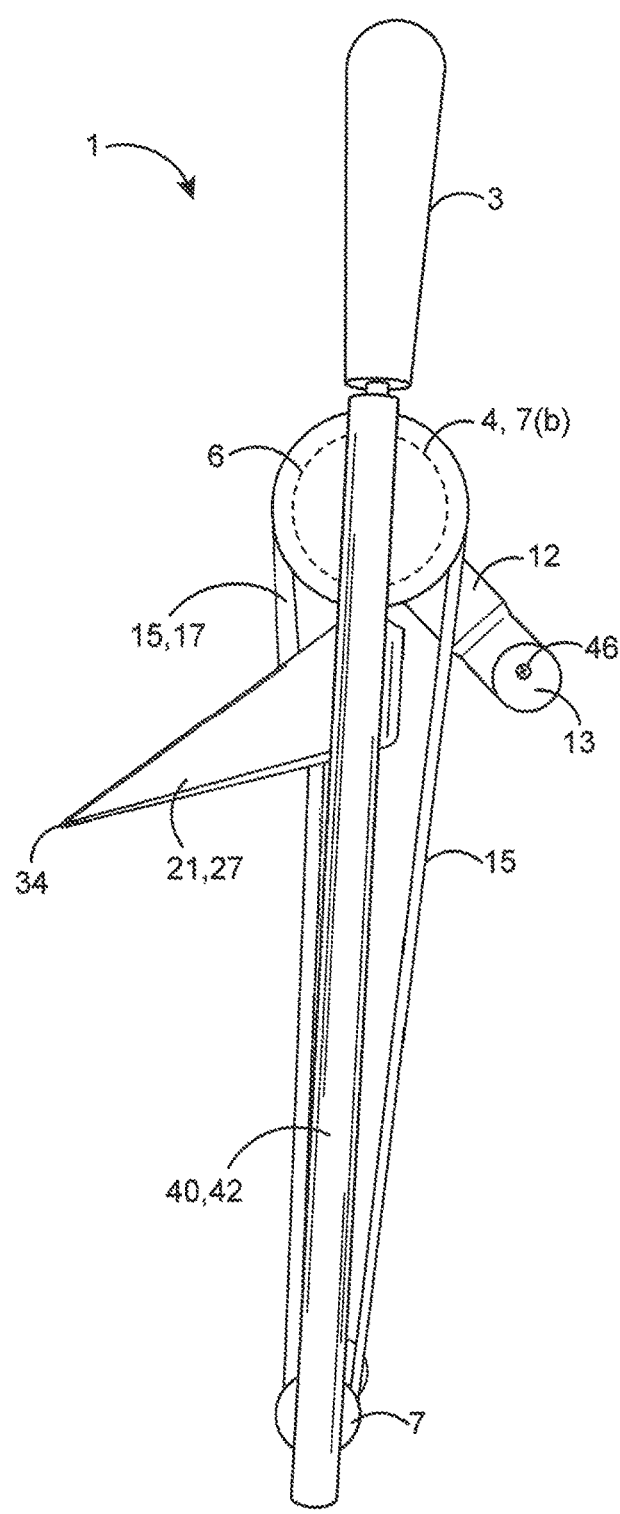
FIG. 2 is a view of the left side of the fat separator 1, wherein the outer face 42 of the shaft 40 is shown.

FIG. 2 presents the left-side view of the fat separator 1, exposing the outer face 42 of the shaft 40. Again, the principal components are visible in FIG. 2: the outer face 42 of the linear shaft 40, the handhold 3, upper pulley 4, knob 13, which is connected to the arm 12 by machine screws 46 (not in view), the outer wall 27 and tip 34 of the spout 21, the lower pulley 7, and the belt 15. A portion of the inner surface 17 of the belt 15 is also visible just below the upper pulley 4. The outer face 42 of the shaft 40 is diametrically opposite the inner face 41, and as a result the outer face 42 is separated from the upper pulley 4.

For illustrative and explanatory purposes only, the disclosures in this inventive concept will be directed primarily toward a mechanical means of operating the fat separator 1 for gleaning fat/oil 53 from a liquid 51. An electrically-powered upper pulley 7 may be constructed to operate the fat separator 1 at a constant or variable speed, as necessary in a commercial setting and in accordance with the quantity of fat particles 53 which must be separated.

Figure 3:
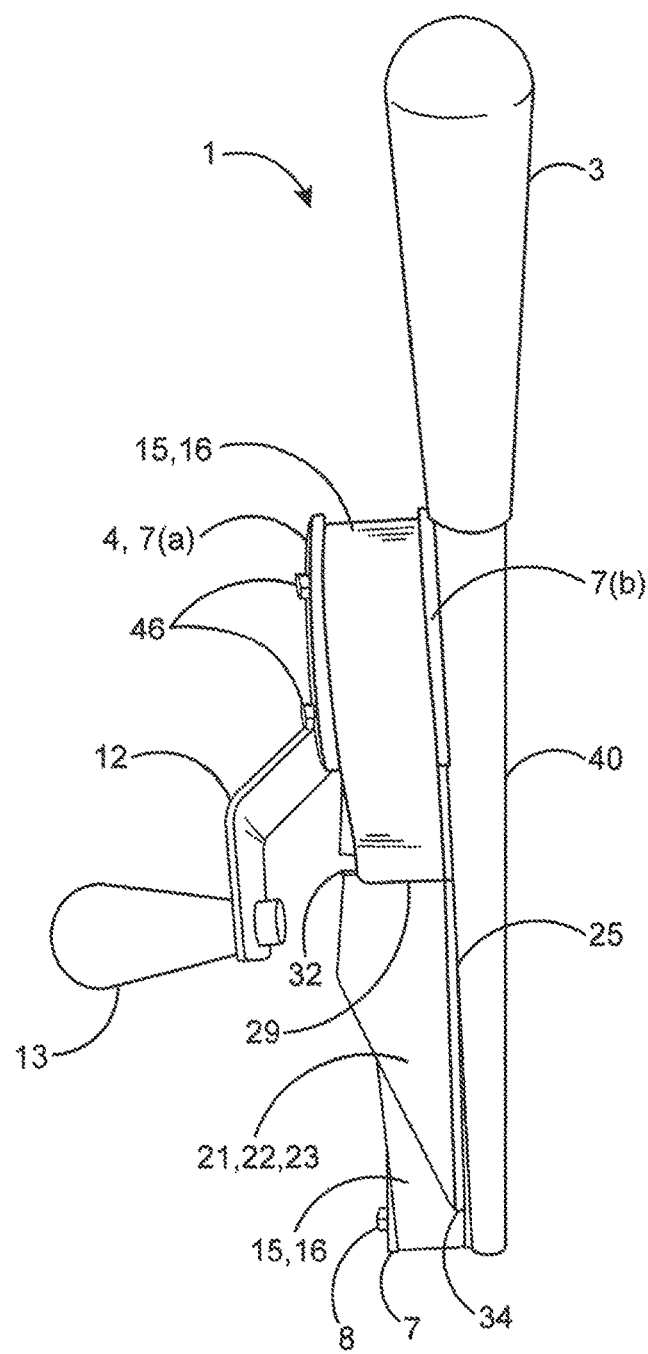
FIG. 3 presents the view of the fat separator 1 as would be seen with the front of the fat separator 1 tilted downward and toward the viewer.

Turning to FIG. 3, there is presented a view as would be seen when the front of the fat separator 1 is tilted downward toward the viewer. FIG. 3 further shows the vertically-oriented shaft 40, the handhold 3, upper pulley 4, knob 13, the arm 12, lower pulley 7, the outer surface 16 of the belt 15, and the bed 22 of the spout 21. From this perspective, it is to be noted that, in order to utilize the fat separator 1, a user would place him/herself on the opposite side of the fat separator 1, grasp the handhold 3 with his/her left hand and immerse the lower pulley 7, including a few inches of the lower part of the shaft 40, into the liquid 51 from which fat/grease particles 53 will be gleaned.

Further describing the operation of the fat separator 1 at FIG. 3, the user applies his/her right hand upon the knob 13 and begins a slow rotation of the knob 13 away from the user's body. As from the perspective of FIG. 1, this entails a clockwise rotation of the knob 13, which in turn rotates the upper pulley 4. The belt 15 is a continuous loop, and is installed about the core 6 of the upper pulley 4 and the core 9 of the lower pulley 7 with a certain degree of tautness. The pre-designed tension serves to provide some amount of friction, such that a turning of the arm 12 causes both the upper and lower pulleys 4, 7 to turn, thereby driving the belt 15. Further, the upper core 6 and lower core 9 are constructed with lateral grooves, or ridges, which serve to counteract any slippage of the inner surface 17 of the belt 15 that may tend to be caused by the lubricating nature of fat 53 particles or oil adhering to the inner surface 17 of the belt 15.

FIG. 3 is drawn to indicate that clockwise rotation of the upper pulley 4 will cause the outer surface 16 of the belt 15 to move downward. The inner surface 17 of the belt 15 is hidden from view as it scrapes against an upper wiper 29 during the downward movement of the belt 15. In this manner, adhering fat particles 53 (not shown) may be wiped from the inner surface 17 of the belt 15 and fall upon the upper surface 23 of the spout bed 22 and flow downward to the tip 34 of the spout 21. The spout wall 25 helps funnel fat particles 53 toward the tip 34 of the spout 21. This condition is also more readily apparent in FIG. 5.

Fat particles 53, (not shown in FIG. 5) which cling to the outer surface 16 of the belt 15 during its circular travel profile are subsequently scraped off the outer surface 16 of the belt 15 by the lower wiper 28. The belt 15 is of a smaller width dimension than the width of the upper surface 23 of the spout bed 22. FIG. 6 displays the fat separator 1 in actual use with a collecting container 52.

Again referring to FIG. 5, there is presented a clearer view of the action of the belt 15 and its movement with respect to the components of the spout 21. It should be noted that in FIG. 5, the operation of the fat separator 1 is facilitated by rotation of the upper pulley 4 in a clockwise direction. This clockwise rotation causes the belt 15 to move upward from the lower pulley 7, which would be immersed in the liquid/broth 51. In the preferred embodiment, the belt 15 is constructed of silicone, which has an inherent characteristic of attracting and augmenting the adhesive properties of fats and oil.

The spout 21, being a one-piece apparatus, is described in more detail by reference to FIG. 4. FIG. 4 is a plan view of a layout of the flat spout 21 material (metal, or rigid elastomeric substance) prior to completing the forming of the final shape of the spout 21. The inner surface 26 of the spout wall 25 contains an upper hole 38 and lower hole 39, both used for the insertion of machine screws 46 in attaching the spout 25 to the shaft 40.

A first bend line 18 indicates where a ninety-degree bend will be induced to bring the upper surface 23 of the spout bed 22 and a guide tab 36 perpendicular to the spout wall 25. A lower tab 31, the guide tab 36, and a lower recess 33 will then be in position to retain the belt 15 in place against the lower wiper 28 during operation of the fat separator 1. FIG. 4(b) is a right profile view of the layout of the spout 21. FIG. 4(b) indicates the direction 44 of the bend B required to render the proper orthogonal relationship of the spout bed 22 and guide tab 36 to the spout wall 25.

It is to be noted that the alignment of the two holes 38, 39, when attached parallel to the linear shaft 40, form an angle relative to the first bend line 18. This orientation, when the spout 21 is attached to the shaft 40, automatically brings the bed 22 of the spout 21 to a downward sloping angle relative to the axis of the shaft 40 during operation of the fat separator 1.

In FIG. 4, a second bend line 19 indicates where a ninety-degree bend will be applied to render a spout backing 30 in a perpendicular orientation to the spout wall 25. Performing the bending rotation at the second bend line 19 will also place an angler 35, the upper wiper 29, and an upper tab 32 in position to correspond with the path of the belt 15 during operation of the fat separator 1. However, for the angler 35 to function as intended a last bend, A, must be made as described in the following paragraph.

An approximate one-hundred ten degree bend in the direction of bend A will be induced at a third bend line 20 to place the angler 35 into position proximate the inner wall 26 of the spout 21. FIG. 4(a) is a left profile view of the layout of the spout 21. FIG. 4(a) indicates the rotation 43 of the bend A required to render the proper angular relationship of the angler 35 and the upper tab 32 to the spout backing 30.

The angler 35 thus integrally forms the upper wiper 29 and the upper tab 32. As a result, the third bend line 20 will consequently place the upper wiper 29 and the upper tab 32 in abutment with the inner surface 17 of the belt 15, as is shown in FIG. 5. During operation of the fat separator 1, the upper wiper 29 and the upper tab 32 work simultaneously to (1) retain the belt 15 in alignment and (2) scrape, (or wipe) the inner surface 17 of the belt 15.

FIG. 5 presents a schematic diagram of the spout 21 installed in its designed position on the shaft 40 to guide the belt 15. As can be seen by reference to FIG. 5, the angler 35 is of a length which places the upper wiper 29 and the upper tab 32 in tension against the inner surface 17 of the belt 15. The belt 15, after moving downward from the upper wiper 29 contact point, is routed such that the outer surface 16 of the belt must contact the lower wiper 28, which is integral to the spout bed 22.

Consequently, the placement of the upper wiper 29 and upper tab 32 instills an angle θ of the belt 15 prior to the outer surface 16 of the belt 15 reaching its contact point with the lower wiper 28 and lower tab 31. In this manner, arriving droplets of fat 53 (shown in FIG. 6) are scraped off the outer surface 16 of the belt 15 onto the upper surface 23 of the spout bed 22. The gleaned fat droplets 53 continue to flow downward to the tip 34 of the spout 21 during actual operation of the fat separator 1.

FIG. 6 illustrates the fat separator 1 functioning while immersed in the liquid/broth 51 of a cooking vessel 50. A user moves the knob 13 and arm 12 in a clockwise manner, causing the upper pulley 4 and lower pulley 7 (immersed in the fluid 51) to rotate. Subsequently, the belt 15, in its travel circuit, transports adhering fat particles 53 over the upper pulley 4, and when contacting the lower wiper 28, causes the fat particles 53 to be deposited upon the bed 22 of the spout 21 and flow into a receiving container 52.

While preferred embodiments of the present inventive concept have been shown and disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, and by no means limited by the scope of the claims presented herein.

What is claimed is:

1. A handheld device which is used under circumstances where heat is applied to a kitchen cooking vessel containing food items combined with water or other liquid, causing fat panicles to be generated as a by-product and where a user of the device desires to remove the fat particles from the liquid, the device comprising:
an upper pulley having a core orthogonal to both a large outer flange, and a large inner flange;
a lower pulley, having a core orthogonal to both a small outer flange, and a small inner flange;
a rigid linear shaft, comprising a linear outer face and a diametrically-opposed linear inner face;
a connection of the axle of the upper pulley to the inner face of the linear shaft, and a corresponding connection of the axle of the lower pulley to the inner face of the liner shaft such that there is enabled co-planar rotation of the two pulleys;
a handhold connected to a first end of said shaft;
an arm connected to the inner flange of said upper pulley;
a knob connected to said arm;
a continuous-loop, flat elastomeric belt having an inner surface and an outer surface, the inner surface engaging the cores of both the upper and lower pulleys; and
a rigid spout consisting of a backing, an angler, an upper wiper, an upper tab, a bed, a wall orthogonal to the bed, the wall further being fixedly attached to the inner face of said shaft immediately below the upper pulley, a lower wiper, lower tab, and guide tab.

2. The device of claim 1, wherein the elastomeric belt is constructed from silicone material.

3. The device of claim 1, further comprising the construction of said pulleys with transverse ridges on the upper core and lower core, respectively.

4. The device of claim 1, wherein the upper wiper is of a greater width dimension than the width of said belt, the upper wiper emanating from said spout in direct abutment with the inner surface of said belt.

5. The device of claim 1, wherein the lower wiper is of a greater width dimension than the width of said belt, said lower wiper emanating from said spout in direct abutment with the outer surface of said belt.

6. Under circumstances where—the preparation of certain foods is accomplished by the application of heat to a kitchen cooking vessel containing water or other liquid, and said preparation results in the generation of floating fat particles,
a handheld device by which a user may remove the fat particles from the liquid, the device comprising:
a rigid linear shaft having an outer face distal from the upper pulley and an inner face proximate the upper pulley;
a handhold connected to one end of said shaft, said handhold for one-handed gripping by a user:
an upper pulley rotatingly connected to the inner face of said shaft, proximate and below said handhold;
an arm fixedly connected to an outer flange of said upper pulley;
a knob connected to said arm, said knob and arm jointly enabling manual hand rotation of the upper pulley;
a lower pulley rotatingly connected to the inner face of said shaft at the opposite end of said shaft, thereby enabling both the upper and lower pulley to have parallel planes of rotation;
a continuous-loop, flat elastomeric belt, having an inner surface and an outer surface, with the inner surface of said belt installed in taut engagement with core of the upper pulley and a core of the lower pulley, thereby effecting simultaneous rotation of both pulleys;
a rigid spout further consisting of a backing, an angler, an upper wiper, an upper tab, a bed, a wall orthogonal to the bed, the wall further being fixedly attached to the inner face of said shaft immediately below the upper pulley, a lower wiper, lower tab, and guide tab; whereby
a user, upon inserting the lower pulley into said liquid and turning the knob in a clockwise direction relative to the inner face of said shaft, (a) causes the belt outer surface to move so as to engage the lower wiper in a scraping action thereby removing particles of fat adhering to the outer face of said belt,
(b) causes the belt inner surface to move so as to engage the upper wiper in a scraping action thereby removing particles of fat adhering to the inner surface of said belt, and
(c) causes all said particles to fall upon the bed of the spout and flow downwards therefrom.

7. The device of claim 6, wherein the elastomeric belt is constructed from silicone material.

8. The device of claim 6, further comprising the construction of said pulleys with transverse ridges on the upper core and lower core, respectively.

9. The device of claim 6, wherein the upper wiper is of a greater width dimension than the width of said belt, the upper wiper emanating from said spout in direct abutment with the inner surface of said belt.

10. The device of claim 6, further comprising the construction the lower wiper of a greater width dimension than the width of said belt and emanating from said spout in direct abutment with the outer surface of said belt.

\* \* \* \* \*